(12) United States Patent
Yamazaki

(10) Patent No.: US 10,722,893 B2
(45) Date of Patent: Jul. 28, 2020

(54) MOUNTING AND HEATING MECHANISM OF SAMPLE COLLECTION CONTAINERS

(71) Applicant: SHIMADZU CORPORATION, Kyoto-shi, Kyoto (JP)

(72) Inventor: Tomoyuki Yamazaki, Kyoto (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 107 days.

(21) Appl. No.: 15/405,492

(22) Filed: Jan. 13, 2017

(65) Prior Publication Data

US 2018/0200719 A1 Jul. 19, 2018

(51) Int. Cl.
*B01L 7/00* (2006.01)
*B01D 15/08* (2006.01)
*B01L 9/06* (2006.01)

(52) U.S. Cl.
CPC .............. *B01L 7/00* (2013.01); *B01D 15/08* (2013.01); *B01L 9/06* (2013.01); *B01L 2300/0832* (2013.01); *B01L 2300/1805* (2013.01)

(58) Field of Classification Search
CPC .... B01L 3/50851; B01L 7/10; B01L 2300/18; B01L 2300/1805; B01L 9/06; B01L 7/52; B01L 7/5255
See application file for complete search history.

(56) References Cited

U.S. PATENT DOCUMENTS

| | | | | |
|---|---|---|---|---|
| 4,124,122 A | * | 11/1978 | Emmitt | B01L 9/06 211/74 |
| 5,410,130 A | * | 4/1995 | Braunstein | B01L 7/52 219/386 |
| 5,459,300 A | * | 10/1995 | Kasman | B01L 3/50851 219/433 |
| 5,475,610 A | * | 12/1995 | Atwood | B01L 3/50851 422/943 |
| 2006/0147354 A1 | * | 7/2006 | Van Erden | B01J 3/04 422/130 |

(Continued)

FOREIGN PATENT DOCUMENTS

JP 5-180847 A 7/1993
JP 2003-149217 A 5/2003

(Continued)

OTHER PUBLICATIONS

English Translation of Communication dated Oct. 17, 2017 from the Japanese Patent Office in counterpart Application No. 2014-190352.

*Primary Examiner* — Jill A Warden
*Assistant Examiner* — Dwayne K Handy
(74) *Attorney, Agent, or Firm* — Sughrue Mion, PLLC

(57) ABSTRACT

A mounting and heating mechanism of sample collection containers for heating sample collection containers includes cup-shaped container heat transfer members for heating sample collection containers from the bottom surface and the side surface, a plate-like bottom surface member heated by a heater, frame members attached to an upper side of the bottom surface member and vertically movably storing the container heat transfer members, and sheet-like elastic heat transfer member disposed between the bottom surfaces of the container heat transfer members stored in the frame members and the upper surface of the bottom surface member.

5 Claims, 3 Drawing Sheets

(56) References Cited

U.S. PATENT DOCUMENTS

2013/0144051 A1* 6/2013 Mueller ................ B01J 19/004
                                                                536/122
2015/0209788 A1* 7/2015 Dickinson ................ B01L 7/02
                                                                414/800

FOREIGN PATENT DOCUMENTS

JP          2010-203823 A      9/2010
WO          2009/044426 A1     4/2009

* cited by examiner

Waste liquid

Solvent for dissolution / cleaning solution (a)  (b)

MOUNTING AND HEATING MECHANISM OF SAMPLE COLLECTION CONTAINERS

TECHNICAL FIELD

The present invention relates to a mounting and heating mechanism of sample collection containers for mounting and heating sample collection containers. In particular, the present invention relates to a mounting and heating mechanism of sample collection containers that can be suitably used especially in a preparative isolation and purification system.

BACKGROUND OF THE INVENTION

For example, in the field of pharmaceutical applications, a preparative isolation and purification system that uses a liquid chromatography is used for the purposes of collecting samples for retaining as a library or analyzing in details various kinds of compounds obtained by means of chemosynthesis. The system disclosed in Patent Literature 1 has been known conventionally as such a preparative isolation and purification system.

In the preparative isolation and purification system disclosed in Patent Literature 1, the target components (compounds) in a sample solution are separated in time by liquid chromatography so as to be introduced into a separate trap column for every target component to be collected once. Next, a solvent (solvent for elution) is allowed to flow to each trap column to dissolve the components captured in the column for a short period of time, thereby collecting a solution containing the target components at a high concentration in a container (collection container). In this way, evaporation and dry solidification processes are performed to each solution isolated in a preparative manner to remove the solvent and collect the target components as a solid.

Patent Literature 2 discloses adding a solution containing target components dropwise in a collection container and spraying gas, such as air or nitrogen, on the dropwise solution to perform evaporation and dry solidification processes. In this preparative isolation and purification system, a solvent in the solution sprayed is evaporated in the collection container to remove the solvent and collect the target components as a powdered solid. The collection container is heated to a temperature comparable as the boiling point of a solvent or somewhat higher than that so that the temperature does not drop below the boiling point of a solvent in order to lower the temperature of the air in the collection container by the heat of vaporization at the time of evaporation of the solvent.

Collection containers are mounted on a collection container rack comprising a bottom surface member, a frame member, a container heat transfer member, and other members, to be heated. The bottom surface member is a plate-like member heated by a heater, and this surface is made of aluminum with high thermal conductivity. The frame member has a frame part in a lattice shape for storing a plurality of collection containers, and this frame is mounted on top of the bottom surface member. The bottom surface of a cup-shaped container heat transfer member made of materials with high thermal conductivity, such as aluminum, or the like, similarly to that of the bottom surface member, is fixed to the frame so as to touch the top surface of the bottom surface member, and a collection container is heated from the bottom surface and the side surface by the heat transmitted from the bottom surface member. Between the top surface of the bottom surface member and the bottom surface of the container heat transfer member, a heat transfer sheet (for example, a sheet of silicone resin subjected to a treatment that improves thermal conductivity) having elasticity is inserted to improve the transfer of heat between both members.

PRIOR ART LITERATURES

Patent Literatures (Patent Literature 1) Japanese Unexamined Patent Application Publication 2003-149217
(Patent Literature 2) International Publication WO 2009/044426

SUMMARY OF INVENTION

Problem to be Solved by the Invention

Although the collection container rack is constituted as mentioned above, in order to reliably heat the solution in the collection containers inserted in the container heat transfer member to a desired temperature and to promptly evaporate a solvent, the top surface of the bottom surface member and the bottom surface of the container heat transfer member that are heated by a heater must reliably touch one another directly or via a temperature control sheet. However, there is a variation in the dimension of each member actually manufactured within the tolerance level established at the time of design. Therefore, if a collection container rack is manufactured in combination with these, a gap of about submillimeter may be formed between the top surface of the bottom surface member (passing through the temperature control sheet) and the bottom surface of the container heat transfer member. When this happens, heat is not sufficiently transferred from the bottom surface member to the container heat transfer member, making it impossible to heat the collection containers to a desired temperature, which is a problem.

The problem the present invention is to solve is to provide a mounting and heating mechanism of sample collection containers that allows the sample collection containers, when mounted, to be reliably heated to a desired temperature.

Means for Solving the Problem

The present invention made in order to solve the aforementioned problem is a mounting and heating mechanism of sample collection containers for mounting and heating sample collection containers, and this mechanism is equipped with a) a cup-shaped container heat transfer member for heating the aforementioned sample collection containers from the bottom surface and the side surface, b) a plate-like bottom surface member heated by a heater, c) a frame member that is mounted to the top surface side of the bottom surface member and that is used for storing the container heat transfer member so as to allow an upward or downward movement, and d) an elastic heat transfer member in a sheet shape arranged between the bottom surface of the container heat transfer member stored in the frame member and the top surface of the bottom surface member.

Aluminum and copper with high thermal conductivity can be suitably used as the material of the above-mentioned bottom surface member or the container heat transfer member. Silicone resin, or the like, that has been subjected to a treatment for improving heat conductivity can be used as the elastic heat transfer member described above.

In the mounting and heating mechanism of sample collection containers according to the present invention, a cup-shaped container heat transfer member stored in a frame member is placed as the bottom surface of the container heat transfer member is in contact with the elastic heat transfer member. In this state, when sample collection containers are stored in the container heat transfer member, the container heat transfer member is pushed vertically downward by the weight of the sample collection containers so that the bottom surface thereof becomes in close contact with an elastic sheet component. Therefore, the heat from the bottom surface member heated by a heater is reliably transmitted to the container heat transfer member, and the sample collection containers are reliably heated to a desired temperature by the container heat transfer member.

A preparative isolation and purification system generally adopts a configuration in which a needle is inserted from the top surface of a sample collection container to allow a dropwise addition of a solution through the needle. In such a preparative isolation and purification system, a container heat transfer member is pushed vertically downward also at the time of insertion of a needle to allow the bottom surface of the member to be in further close contact with the elastic heat transfer member.

The mounting and heating mechanism of sample collection containers according to the present invention can have a configuration in which a frame member is configured to be removable from the bottom surface member, and the frame member and/or the container heat transfer member has a fall prevention member that prevents the container heat transfer member from falling from the frame member.

The heater for heating the bottom surface member and the bottom surface member of the main unit are usually configured as one unit with the system as a part of preparative isolation and purification system in many cases in order to connect the wiring. By such configuration, the frame member and the container heat transfer member can be removed from the bottom surface member to allow portability, and the efficiency of the task of mounting sample collection containers can be improved.

Effect of the Invention

By using the mounting and heating mechanism of sample collection containers according to the present invention, the sample collection containers mounted on the mounting and heating mechanism can be reliably heated to a desired temperature.

BRIEF DESCRIPTION OF THE DRAWINGS

Hereinafter, examples of embodiment for carrying out the present invention will be given and described. FIG. 1 is a schematic configuration diagram of a recovery and powdering device that has one example of embodiment of the mounting and heating mechanism of sample collection containers according to the present invention. This recovery and powdering device is included in a preparative isolation and purification system mentioned above and is a device for collecting, from a trap column, target components isolated by a preparative isolation liquid chromatography, not shown, and captured in a trap column to perform powderization.

Figure 1:
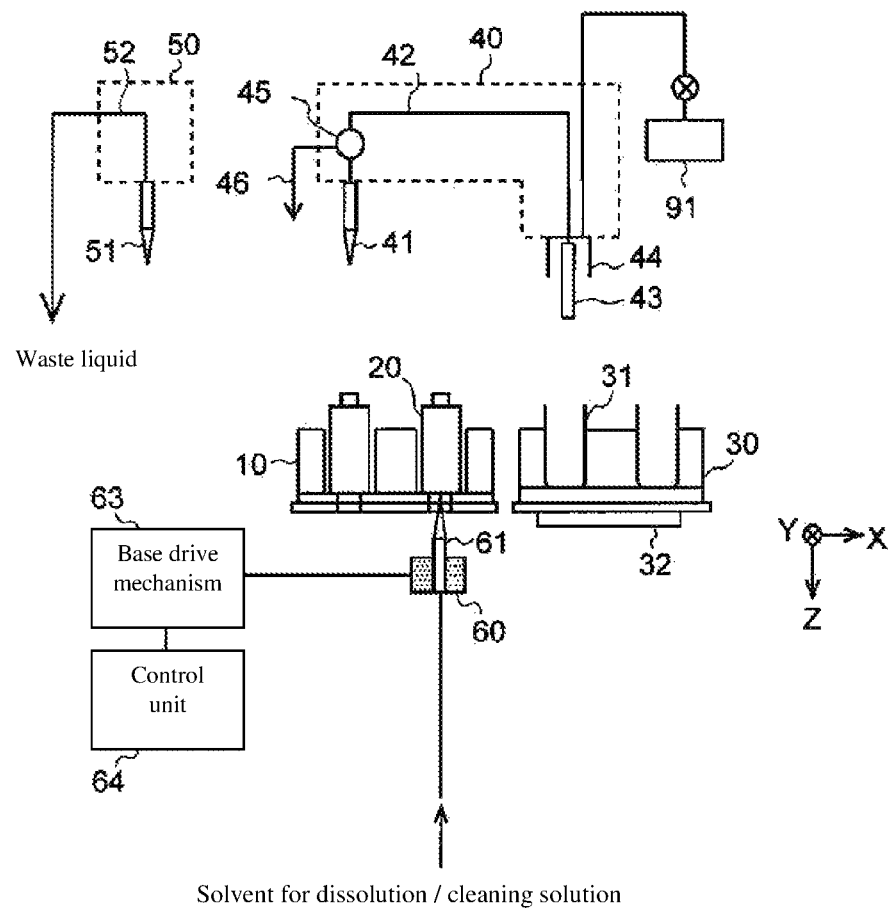
FIG. 1 is a schematic configuration diagram of a recovery and powdering device having one example of embodiment of the mounting and heating mechanism of sample collection containers according to the present invention.

The inlet end of the trap column 20 is held downward while the outlet thereof held upward at the column rack 10. The target components mutually different from one another isolated in advance by a preparative isolation liquid chromatography, not shown, are captured in this column 20.

Eight collection containers 31 for collecting the target components eluted from the trap column 20, respectively, are stored in the collection container rack 30. A heater 32 for heating the collection containers 31 is provided to the collection container rack 30.

A collecting head 40 for sending the eluate from the trap column 20 to the collection containers 31 is provided above the column rack 10 and the collection container rack 30. The collecting head 40 is provided with a piping 42, an eluate recovery needle 41 and a discharge needle 43 connected to both ends of the piping 42 where both tips are turned downward. A gas supply line 44 is provided in the outer periphery of the discharge needle 43, and a gas for atomization (air, nitrogen, and so on) is supplied to the gas supply line 44 from a gas source 91. The piping 42 is provided with a discharge/recovery switch valve 45 for switching whether to send the liquid that flows in the piping 42 from the eluate recovery needle 41 to the discharge channel 46 that goes into a discharge port or to the discharge needle 43. The collecting head 40 can be moved in a vertical direction (Z axial direction in the drawing), forward and backward direction (Y axial direction in the drawing), and right and left directions (X axial direction in the drawing) by a drive mechanism, not shown.

A drainage collecting head 50 for discharging a cleaning solution to the outside after passing through the trap column 20 is provided above the column rack 10 and the collection container rack 30. The drainage collecting head 50 is equipped with a piping 52 and a drainage collecting needle 51 connected to one end of the piping 52 where the end is turned downward and can be moved vertically, forward and backward, and right and left by a drive mechanism, not shown.

On the other hand, a liquid supply needle 61 set up with the tip thereof being turned upward on a plate-like base member 60 is arranged at the lower part of the column rack 10. The liquid supply needle 61 is used for supplying a solvent for dissolution for eluting the target components from the trap column 20 or sending a cleaning solution for washing the trap column 20, wherein the needle can be moved vertically by driving a base member 60 by a base drive mechanism 63 equipped with a motor, and other components. The base drive mechanism 63 is controlled by a control unit 64 comprising a dedicated hardware and/or a personal computer. Although the control unit 64 controls the operation of various kinds of constituent components (a pump, a valve, and other components) besides the base drive mechanism 63, the control line in FIG. 1 is omitted for the sake of simplification.

The recovery and powdering device according to this example of embodiment has a feature in the structure of the collection container rack 30 (equivalent to the mounting and heating mechanism of sample containers of the present invention). Hereinafter, this point will be described with reference to FIGS. 2 and 3.

Figure 2:
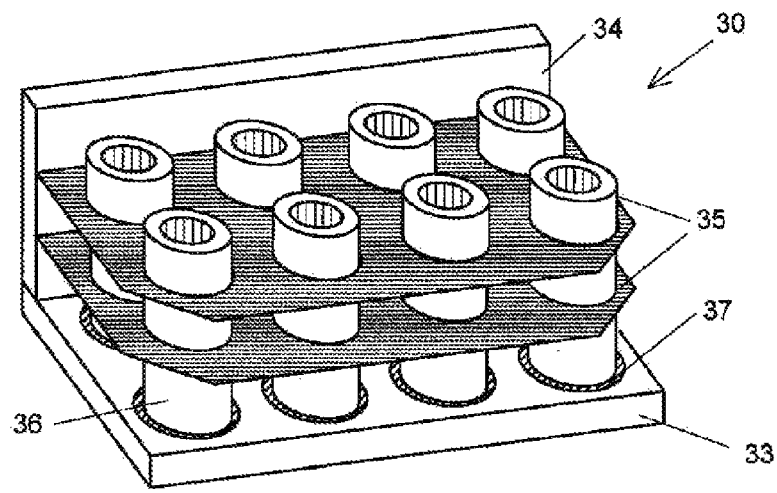
FIG. 2 is a perspective view of the collection container rack of this example of embodiment.

FIG. 2 is a perspective view of the collection container rack 30 of this example of embodiment. The collection container rack 30 has a bottom surface member 33, which is an aluminum plate material, a side surface member 34, two plate-like frame members 35, cup members 36 (container heat transfer members) made of aluminum, heat transfer sheet members 37 (elastic heat transfer member) made of silicone, and a heater 32 for heating the bottom surface member 33. The side surface member 34 is not mandatory; it may be configured by securing a frame member 35 to the bottom surface member 33.

The two frame members 35 are members horizontally installed from the side surface member 34 and each frame member has holes 351 into which eight cup members 36 are stored. The cup member 36 is inserted in this hole 351 from above and stored so as to allow an up-and-down (i.e., vertical) motion. Arrange on the top surface of the bottom surface member 33 are the heat transfer sheet members 37 in the position where the cup members 36 are stored.

Figure 3:
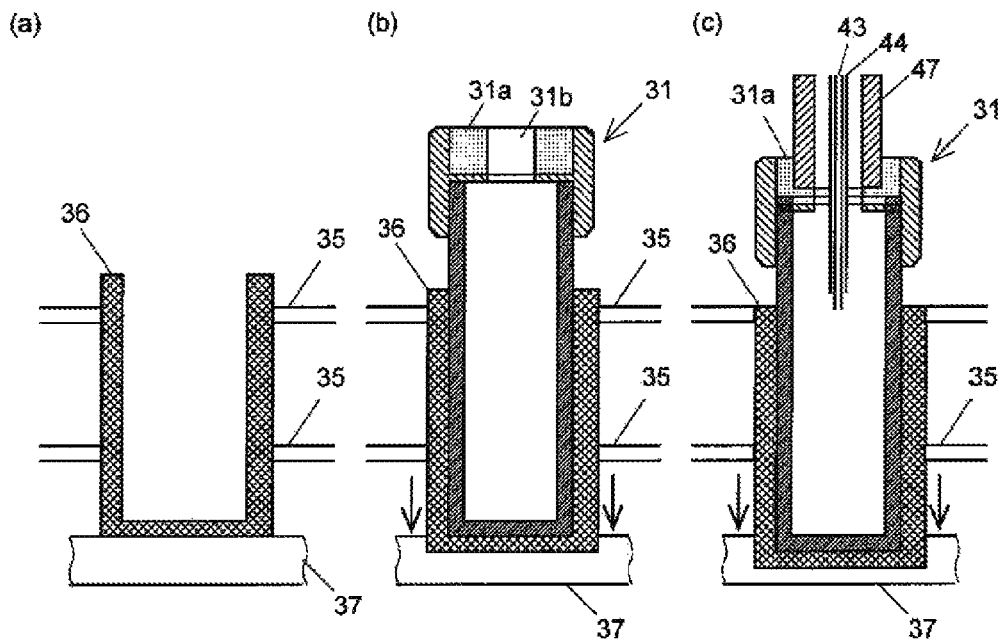
FIG. 3 is a drawing used for describing the close contact operation of the cup member in this example of embodiment.

The state before the collection container 31 is stored in the collection container rack 30 of this example of embodiment is shown in FIG. 3 at (a). Before the accommodation of the collection container 31, the cup member 36 is stored in a state where the bottom surface thereof is lightly touched the heat transfer sheet member 37.

Next, FIG. 3 at (b) shows a state where the collection container 31 is being stored in the cup member 36. In this state, the cup member 36 is pushed downward by the weight of the collection container 31 to allow the bottom surface of the cup member 36 to be in close contact with the heat transfer sheet member 37.

Furthermore, FIG. 3 at (c) shows a state where the discharge needle 43 was inserted into the upper opening 31b of the collection container 31 to introduce a solution containing target components into the collection container 31. When the discharge needle 43 is inserted into the upper opening 31b of the collection container 31, the outer peripheral member 47 of the unit that has a gas supply line 44 provided to the discharge needle 43 and its periphery is pressed to the cushioning material 31a of the collection container 31. Thereby, the cup member 36 in which the collection container 31 is stored is also pushed downward, as shown in FIG. 3 at (b), further allowing the bottom surface of the cup member 36 to be in close contact with the heat transfer sheet member 37.

When the collection container 31 is stored in the cup member 36, the bottom surface member 33 is heated by the heater 32. Then, the heat is transferred from the heated bottom surface member 33 to the cup member 36 via the heat transfer sheet member 37, and the collection container 31 is heated by this heat from the bottom surface and the side surface. The temperature that heats the collection container 31 is preliminarily set to a temperature comparable to the boiling point of a solvent in a solution or slightly higher than that, and the heater 32 is controlled by a control unit, not shown, according to the preset temperature.

In the collection container rack 30 of this example of embodiment, as described above, the cup member 36 is pushed downward so as to be in close contact with the heat transfer sheet member 37 at the time of storing the collection container 31 in the cup member 36 (FIG. 3 at (b)) and at the time of inserting the discharge needle 43 into the upper opening 31b of the collection container 31 (FIG. 3 at (c)). Therefore, the heat from the bottom surface member 33 heated by the heater 32 is reliably transferred to the cup member 36 via the heat transfer sheet member 37. Therefore, the collection container 31 can be reliably heated to a desired temperature.

The above-mentioned example of embodiment is merely an example and it can be modified as appropriate in accordance with the gist of the present invention.

The example of embodiment described above has a configuration in which the cup members 36 stored in the frame member are supported by the bottom surface member 33; however, it can also be configured by forming a fall prevention means in the cup member 36 or/and the frame member 35 so as to support the cup member 36 by the frame member 35.

Figure 4:
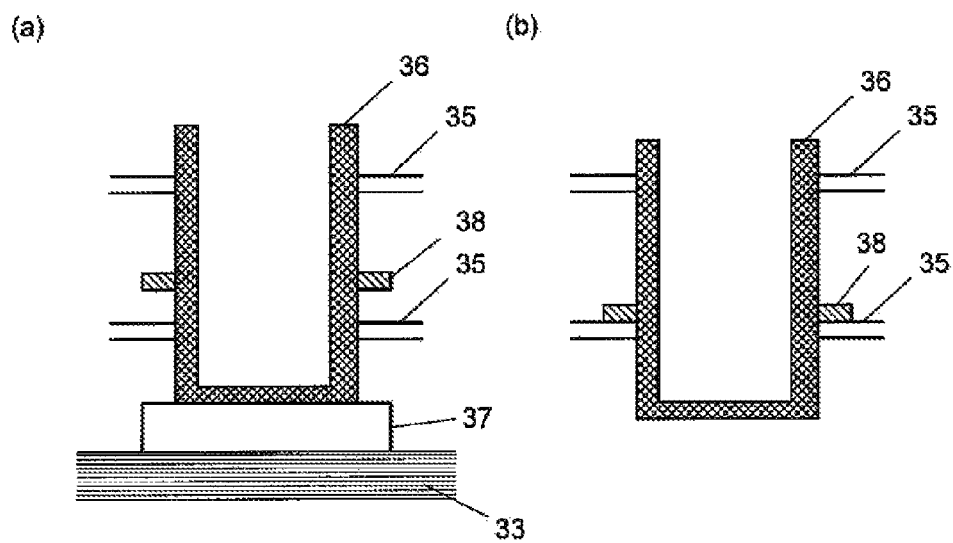
FIG. 4 is a drawing used for describing an example of a locking section of a cup member.

FIG. 4 is a side view showing an example of a fall prevention means. This fall prevention means is a locking part 38 provided by the side periphery of the cup member 36 to prevent the cup member 36 from falling by locking the locking part 38 on the top surface of the frame member 35.

Figure 5:
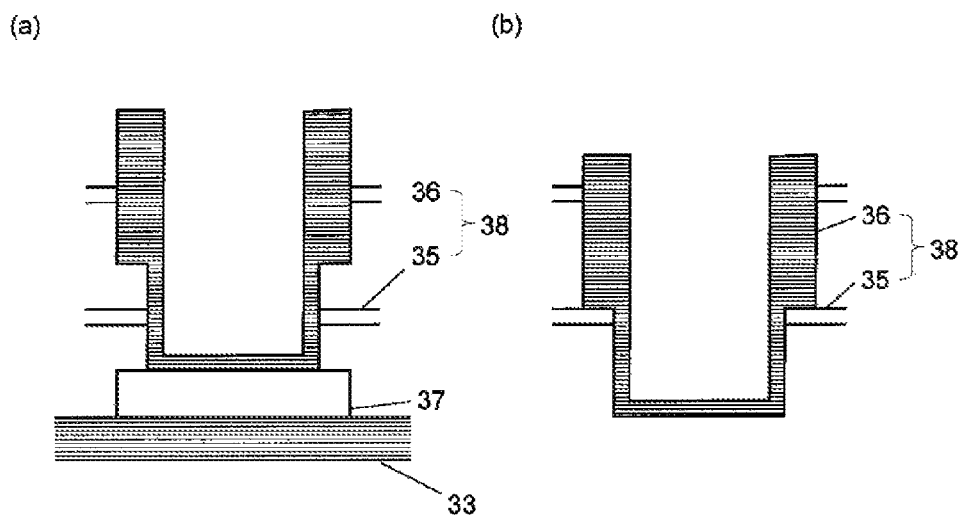
FIG. 5 is a drawing used for describing another example of a locking part of a cup member.

Another example of a fall prevention means is shown in FIG. 5. This fall prevention means has an outer shape in which the cup member 36 has a small diameter on the lower part and a large diameter on the upper part. The frame member 35 is provided with a lower part frame member in which a hole having the same size as the aforementioned small diameter is formed and an upper frame member in which a hole having the same size as the aforementioned large diameter is formed. In this modes, the fall of a cup member is prevented by engaging the large diameter part of the cup member on top of the hole of the small diameter of the lower part frame member to lock it. That is, the frame member 35 and the cup member 36 work together to function as the locking part 38.

EXAMPLES OF EMBODIMENT

Figure 6:
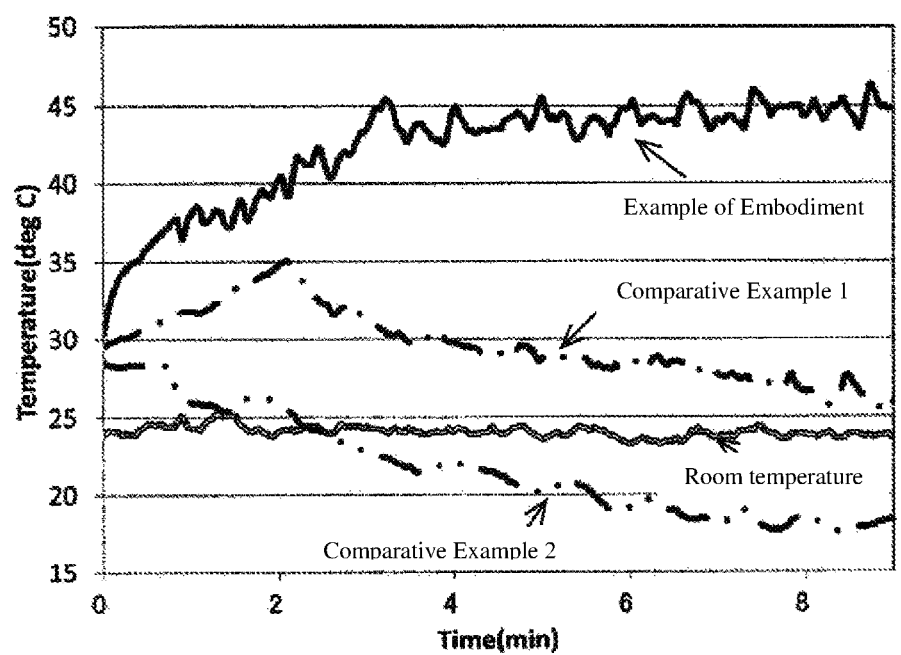
FIG. 6 is a graph illustrating the measurement result of the temperature change when the collection container was mounted and heated to the collection container rack of this example of embodiment.

The temperature change of the collection containers 31 when the collection containers 31 were mounted and heated on the collection container rack 30 of this example of embodiment was measured and compared with those in Comparative Examples 1 and 2. Comparative Example 1 was the temperature change of collection containers when the bottom surfaces of the collection containers 31 were mounted in a state of being slightly in close contact with the heat transfer sheet members 37, and Comparative Example 2 was the temperature change of collection containers when the containers were mounted in a state where there was a 0.3-mm gap between the bottom surfaces of the collection containers 31 and the heat transfer sheet members 37. The preset heating temperature of the collection containers 31 in the example of embodiment and Comparative Examples 1 and 2 was set to 45 degree, a solvent in which dichloromethane and methanol were mixed at a ratio of 9:1 was fed into the solution at a flow rate of 0.3 mL/min, and a nitrogen gas was sprayed in collection containers [at the capacity of] 1.7 L/min so as to atomize and evaporate the solvent. FIG. 6 shows the result of measuring the temperature change for nine minutes in this state.

As can be seen from FIG. 6, in the example of embodiment, the temperature of the collection containers 31 reached 45 degree three minutes after the heating started, and then the temperature inside the collection container 31 was maintained at 45 degree. On the other hand, in Comparative Example 2, the collection containers 31 were not heated but cooled instead to below room temperature by the heat of vaporization at the time of evaporation of a solvent. In Comparative Example 1, although the temperature in the collection container 31 increased immediately after heating, the temperature cooled to room temperature by the heat of vaporization at the time of evaporation of a solvent thereafter. Conventionally, each member that constitutes a collection container rack has various dimensions within the range of tolerance, and as can be seen from Comparative Example 1 or 2, the bottom surface of a collection container might not be in close contact with the heat transfer sheet member, and the collection container sometimes could not be heated to a desired temperature. It was confirmed in this example of embodiment that, since the configuration in which the bottom surfaces of the collection containers 31 were pushed downward to be in close contact with the heat transfer sheet members 37, the heat from the bottom surface member 33 heated by the heater 32 was sufficiently transferred to the cup members 36, and the collection containers 31 could be reliably heated to a desired temperature.

The example of embodiment is merely an example and can be modified as appropriate in accordance with the gist of the present invention. The example of embodiment described above presents a mounting and heating mechanism of sample collection containers used in a recovery and powdering device contained in a preparative isolation and purification system, but it can also be used in various devices for mounting and heating collection containers. In the example of embodiment described above, aluminum was used as the material of the bottom surface member and the cup member; however, using other materials, such as copper, can also produce the same effect. Materials other than silicone resin can also be used as the material for the heat transfer sheet member.

EXPLANATIONS OF REFERENCES

10 . . . Column rack
20 . . . Trap column
30 . . . Collection container rack
31 . . . Collection container
32 . . . Heater
33 . . . Bottom surface member
34 . . . Side surface member
35 . . . Frame member
351 . . . Hole
36 . . . Cup member
37 . . . Heat transfer sheet member
38 . . . Locking part
40 . . . Collecting head
41 . . . Eluate recovery needle
43 . . . Discharge needle
44 . . . Gas supply line
50 . . . Drainage collecting head
51 . . . Drainage collecting needle
60 . . . Base member
61 . . . Liquid supply needle
63 . . . Base drive mechanism
64 . . . Control unit
91 . . . Gas source

What is claimed:

1. A sample collection device comprising:
   sample collection containers including an upper opening and a cushioning material, into which a solution containing target components is introduced;
   cup-shaped container heat transfer members configured to store the sample collection containers and configured to heat the sample collection containers from a bottom surface and a side surface;
   a heater;
   a plate shaped bottom surface member heated by the heater;
   at least one frame member mounted to a top surface side of the bottom surface member and used to store the cup-shaped container heat transfer members so as to allow vertical motion;
   sheet-shaped elastic heat transfer members arranged between a bottom surface of the cup-shaped container heat transfer member stored in the at least one frame member and a top surface of the bottom surface member; and
   a discharge needle including an outer peripheral member, configured to be inserted into the upper opening of the collection container while the outer peripheral member of the discharge needle is pressed to the cushioning material of the collection container, so as to introduce the solution containing target components into the collection container,
   wherein
   the entire bottom surface of the cup-shaped container heat transfer member is in close contact with the elastic heat transfer member by receiving the weight of the sample collection containers and the force from the outer peripheral member of the discharge needle.

2. The sample collection device according to claim 1, wherein
   the at least one frame member includes at least two frame members that are horizontally mounted to a top surface side of the bottom surface member, spaced apart from each other, and respectively comprise holes that are used to store the container heat transfer members so as to allow vertical motion.

3. The sample collection device according to claim 1, wherein
   an upper diameter of an upper part of each of the cup-shaped container heat transfer members is larger than a lower diameter of a lower part of each of the cup-shaped container heat transfer members, respectively, and
   the upper diameter and the lower diameter are uniform.

4. The sample collection device according to claim 2, wherein
   the at least two frame members are configured to be removable from the plate-shaped bottom surface member, and
   the at least two frame members and/or the cup-shaped container heat transfer members have fall prevention members for preventing the cup-shaped container heat transfer members from falling from the at least two frame members.

5. The sample collection device according to claim 3, wherein
   the at least one frame member includes at least two frame members; and a first frame member of the at least two frame members comprise holes with respective diameters corresponding to the upper diameter, and a second frame member of the at least two frame members comprise holes with respective diameters corresponding to the lower diameter.

\* \* \* \* \*